(12) United States Patent
Saito

(10) Patent No.: US 8,208,631 B2
(45) Date of Patent: Jun. 26, 2012

(54) GROUP MANAGEMENT APPARATUS, AND INFORMATION PROCESSING APPARATUS AND METHOD

(75) Inventor: Kentaro Saito, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1052 days.

(21) Appl. No.: 11/703,107

(22) Filed: Feb. 7, 2007

(65) Prior Publication Data

US 2007/0201087 A1 Aug. 30, 2007

Related U.S. Application Data

(63) Continuation of application No. PCT/JP2005/014437, filed on Aug. 5, 2005.

(30) Foreign Application Priority Data

Aug. 20, 2004 (JP) .................................. 2004-241197

(51) Int. Cl.
  *H04L 29/06* (2006.01)
(52) U.S. Cl. ......................................... 380/258; 380/277
(58) Field of Classification Search .................... None
  See application file for complete search history.

(56) References Cited

U.S. PATENT DOCUMENTS

| | | | |
|---|---|---|---|
| 5,321,502 A | 6/1994 | Matsumoto et al. | |
| 5,362,684 A | 11/1994 | Saito et al. | |
| 5,510,631 A | 4/1996 | Saito et al. | |
| 6,181,939 B1* | 1/2001 | Ahvenainen | 455/433 |
| 6,289,036 B1 | 9/2001 | Saito et al. | |
| 6,295,361 B1* | 9/2001 | Kadansky et al. | 380/278 |
| 6,742,116 B1 | 5/2004 | Matsui et al. | 713/171 |
| 7,055,030 B2 | 5/2006 | Negawa | 713/163 |
| 2001/0046065 A1* | 11/2001 | Furukawa et al. | 358/1.15 |
| 2003/0030842 A1* | 2/2003 | Suyehira | 358/1.15 |
| 2003/0236823 A1* | 12/2003 | Patzer et al. | 709/203 |
| 2003/0236889 A1 | 12/2003 | Manion et al. | 709/227 |
| 2004/0002345 A1 | 1/2004 | Miki | 455/456.1 |

FOREIGN PATENT DOCUMENTS

JP 08-102735 4/1996

(Continued)

OTHER PUBLICATIONS

Machine Translation of Junichi reference submitted in IDS JP 2001-1320776.*

(Continued)

*Primary Examiner* — Gilberto Barron, Jr.
*Assistant Examiner* — Simon Kanaan
(74) *Attorney, Agent, or Firm* — Fitzpatrick, Cella, Harper & Scinto

(57) ABSTRACT

A group management apparatus which manages a group in which one or a plurality of information processing apparatuses connect to each other by wireless communication detects the position of an information processing apparatus and determines whether the information processing apparatus exists in a predetermined range. When determining that the information processing apparatus exists in the predetermined range, the group management apparatus notifies the information processing apparatus of an encryption key to be used in the group. Upon detecting, based on the position detection result, that the number of information processing apparatuses existing in the predetermined range has changed, the group management apparatus updates the encryption key.

22 Claims, 12 Drawing Sheets

FOREIGN PATENT DOCUMENTS

| | | |
|---|---|---|
| JP | 9-064867 | 3/1997 |
| JP | 10-056449 | 2/1998 |
| JP | 10-257064 | 9/1998 |
| JP | 10-336745 | 12/1998 |
| JP | 11-196029 | 7/1999 |
| JP | 2000-115153 | 4/2000 |
| JP | 2001-320776 | 11/2001 |
| JP | 2002-502204 | 1/2002 |
| JP | 2002-041461 | 2/2002 |
| JP | 2003-069547 | 3/2003 |
| JP | 2004-032336 | 1/2004 |
| JP | 2004-046855 | 2/2004 |
| WO | 99/39524 | 8/1999 |

OTHER PUBLICATIONS

Machine Translation of Shuji reference submitted in IDS JP 9064867.*

Japanese Office Action dated Mar. 26, 2010, from corresponding Japanese Application No. 2004-241197.

* cited by examiner

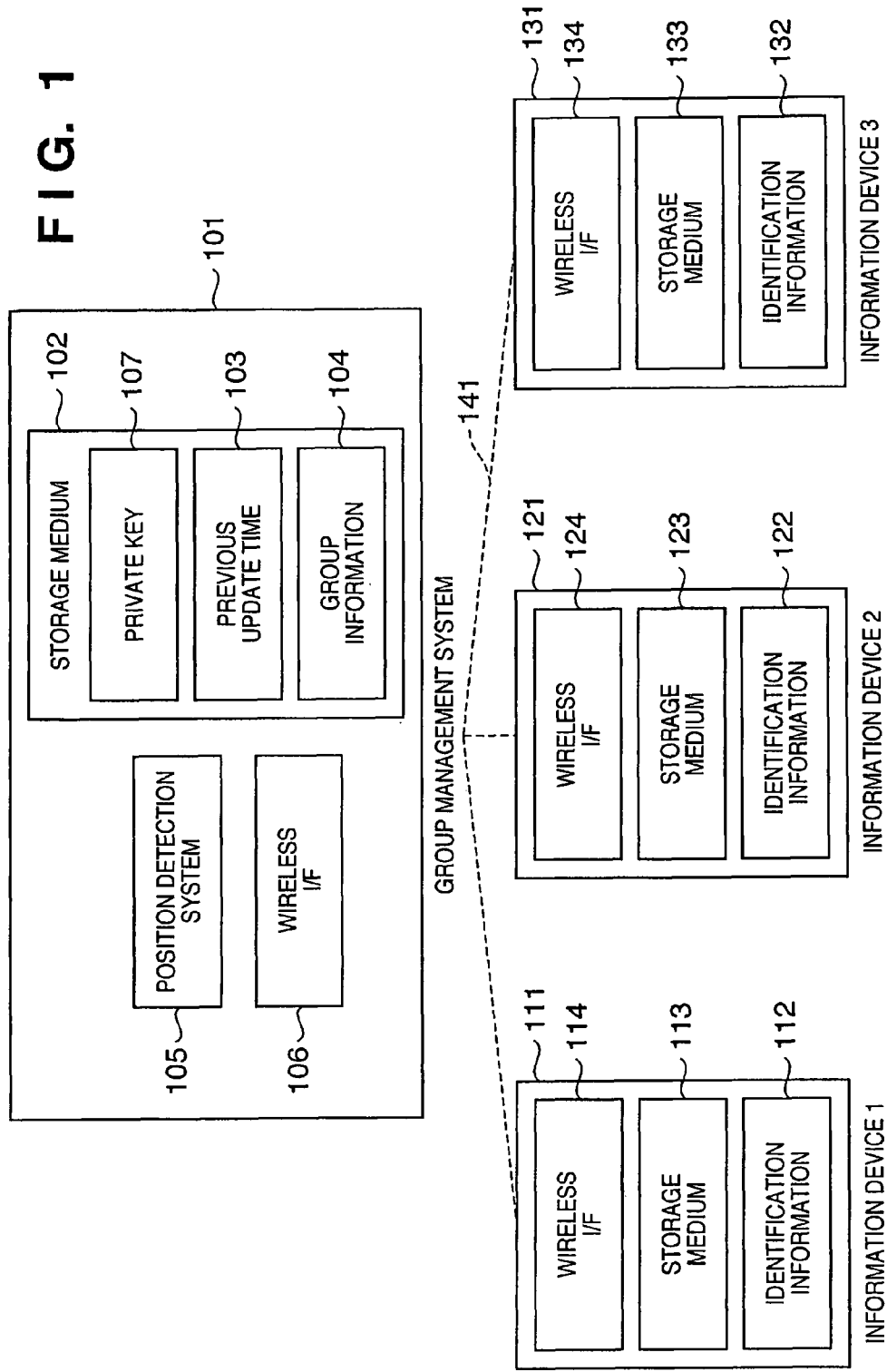

FIG. 8

GROUP INFORMATION

| INFORMATION TERMINAL | POSITION | IDENTIFICATION INFORMATION | BUILT-IN DEVICE |
|---|---|---|---|
| INFORMATION DEVICE 1 | INDOOR | MAC1 | × |
| INFORMATION DEVICE 2 | INDOOR | MAC2 | × |
| INFORMATION DEVICE 3 | INDOOR | MAC3 | ○ |

801

F I G. 10
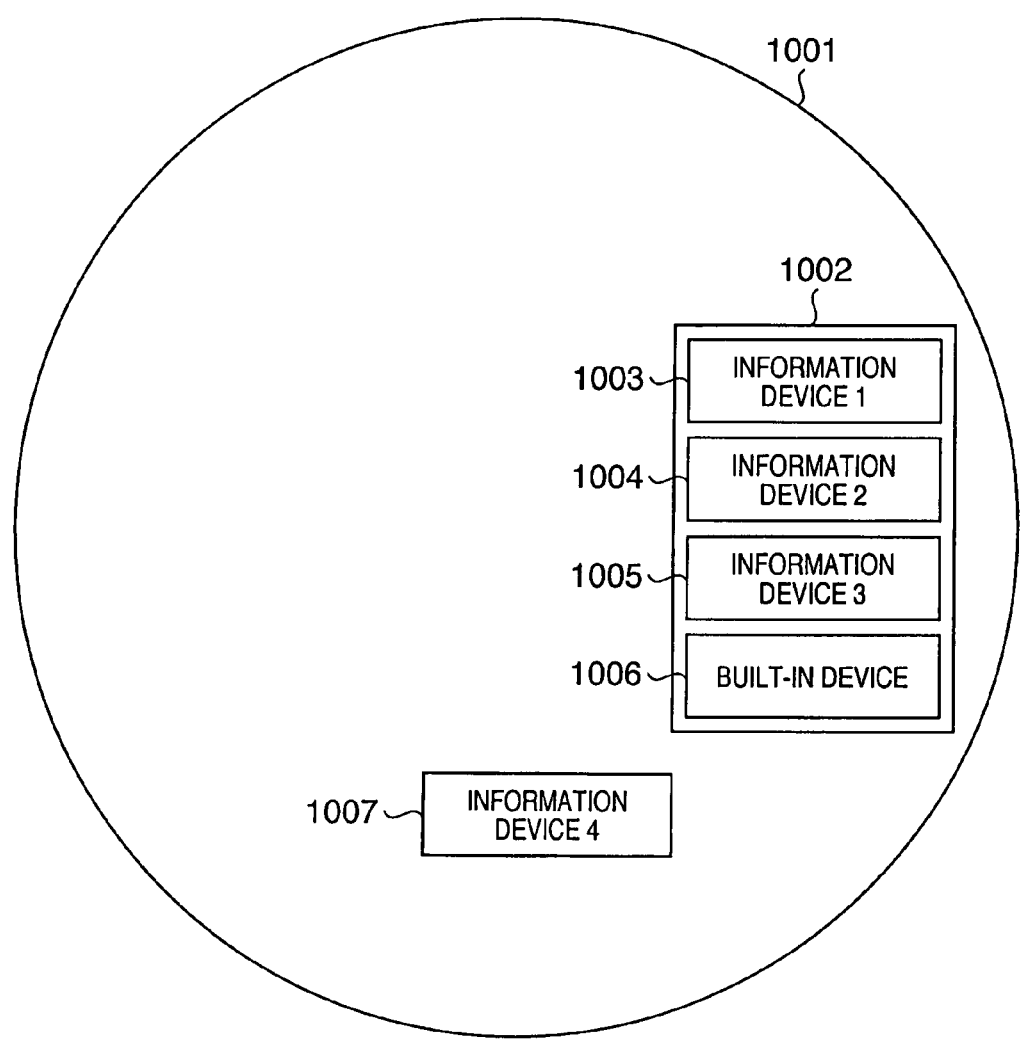

F I G. 11

| PARTICIPATION | NAME |
|---|---|
| ○ | INFORMATION DEVICE 1 |
|  | INFORMATION DEVICE 2 |
| ○ | INFORMATION DEVICE 3 |
| ● | BUILT-IN DEVICE |

~1101

GROUP MANAGEMENT APPARATUS, AND INFORMATION PROCESSING APPARATUS AND METHOD

This application is a continuation of International Application No. PCT/JP2005/014437, filed Aug. 5, 2005, the contents of which are incorporated by reference herein.

TECHNICAL FIELD

The present invention relates to a technique of allowing information devices existing in a limited range to form a group and wirelessly exchange information with each other.

BACKGROUND ART

Recently, with advances and improvements in communication standards, hardware, and OSs, wireless information communication networks have been generalized. As more users have used information devices in the form of being used during movement, e.g., notebook PCs, PDAs, and cell phones, radio has been becoming an indispensable infrastructure in constructing an information communication network. Consider, for example, a case wherein when holding a meeting, each participant brings an information terminal to the meeting to form a temporary network which allows only the participants in the meeting room to share information. Consider also a case wherein information devices existing in a limited range (e.g., a floor, room, or section) in a building accommodating a plurality of offices share information. Applying wired network connection to these cases makes it necessary to redo interconnection every time devices change. This makes it difficult to form a network. In contrast to this, information devices capable of wireless communication can share information without redoing interconnection as long as wireless access points exist.

Japanese Patent Laid-Open No. 2004-046855 discloses an arrangement which allows transmission/reception of information upon automatic wireless connection. In addition, Japanese Patent Laid-Open No. 11-196029 discloses a method in which in forming a plurality of subgroups by radio, a given child device participates in a subgroup by outputting a grouping request to a parent device when entering a place at a given position. Both of these techniques use wireless communication to improve usability.

An information communication network using radio waves, however, does not allow to visually check the reachable range of radio waves, and hence requires security management stricter than that for a conventional wired information communication network. Challenges for an information communication network using radio waves, in particular, are to safely distribute keys for the encryption of communication and prevent tapping caused by spoofing using a key acquired once. Japanese Patent Laid-Open Nos. 2004-046855 and 11-196029 give no consideration to such challenges.

With regard to radio techniques and security, Japanese Patent Laid-Open No. 2004-032336 discloses a method in which when, for example, a user accesses a file in a server by using a portable information terminal, a position and a time zone where the user can access the file is registered in the server in advance. Although this method describes access right to a file, it does not describe communication encryption. For this reason, in an in-house wireless LAN or the like, intercepting radio waves makes it possible to acquire information with no access right. The scheme of registering, with a server in advance, a position and a time at which a given user can access the server is not suitable for an application designed to safely exchange information within a group formed by temporary members as in a meeting, because there are too many setting items.

With regard to position measurement techniques, there has been proposed a method based on GPS, a method which can measure a position more accurately by also using radio waves from a base station than by using GPS, and a method of measuring a position by using the difference in arrival time between radio waves from a wireless access point. In addition, there have been proposed various methods, e.g., a method using an apparatus which causes a fluorescent lamp to emit infrared light to transfer a position.

Under the circumstances, conventional radio techniques are required to be in the form of allowing users to secure ranges, which have been obscure, by using position measurement techniques. Furthermore, such techniques are required to simply prevent tapping by safely distributing keys to a temporary group and simply prevent spoofing using a previously acquired key by updating the key.

DISCLOSURE OF INVENTION

Problems that the Invention is to Solve

In forming a secure information sharing group with a limited wireless range by using a conventional technique, a user needs to manually perform operations associated with participation and separation in/from a group, and in particular, distribution and management of encryption keys. This imposes a heavy load on the user.

The present invention has been made in consideration of the above problem, and has as its object to allow automatic operation associated with participation in a group and the distribution and management of encryption keys in forming a secure information sharing group like that described above, thereby improving convenience for a user.

Means of Solving the Problems

In order to achieve the above object, a group management apparatus according to an aspect of the present invention has the following arrangement.

There is provided a group management apparatus which manages a group in which one or a plurality of information processing apparatuses connect to each other by wireless communication, comprising detection means for detecting a position of an information processing apparatus, determination means for determining, based on the detection means, whether the information processing apparatus exists in a predetermined range, notification means for notifying the information processing apparatus of an encryption key to be used in the group, when the determination means determines that the information processing apparatus exists in the predetermined range, and updating means for updating the encryption key when detecting, based on a position detection result obtained by the detection means, that the number of information processing apparatuses existing in the predetermined range has changed.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 is a view showing the arrangement of a wireless communication system according to the first embodiment;

FIG. 8 is a view showing an example of a table associated with group information which the group management system holds;

FIG. 10 is a view schematically showing a radio reachable range, a limited range, and the position of an information device in the third embodiment; and FIG. 11 is a view showing an example of a user interface window by which a user selects an information device which participates in a group in the third embodiment.

BEST MODE FOR CARRYING OUT THE INVENTION

Figure 2A:
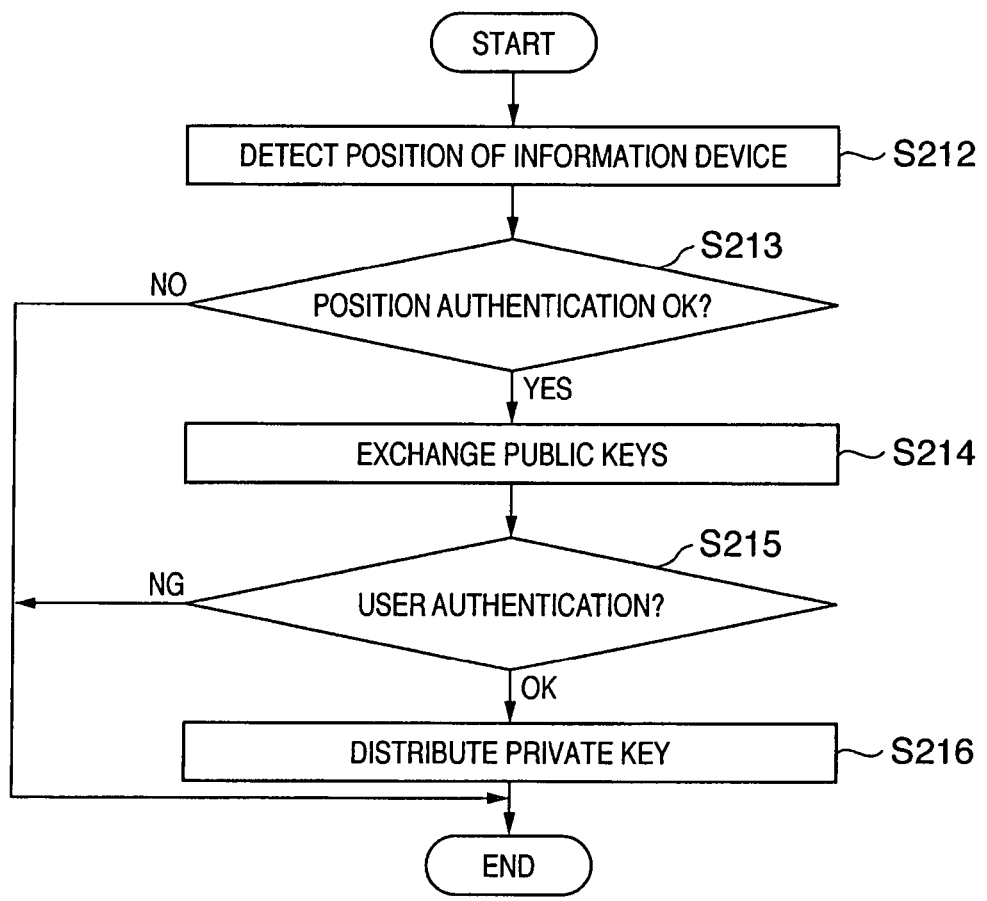
FIG. 2A is a flowchart for explaining private key distribution processing by a group management system.

The preferred embodiments of the present invention will be described below with reference to the accompanying drawings.

<First Embodiment>

A characteristic feature of the first embodiment lies in periodically updating a key for encrypting a communication path. FIG. 1 is a view showing the arrangement of a wireless communication system according to the first embodiment. A group management system 101 includes a storage medium 102 which is holding a private key 107 used for the encryption of data communication between groups, group information 104 (a table like that shown in FIG. 8), and a previous update time 103 of the private key. The group management system 101 comprises a position detection system 105 for discriminating whether an information device has entered a predetermined range and a wireless I/F 106. The group management system 101 may be incorporated in the hardware of a wireless access point or position detection system or in a built-in device such as a personal computer, copying machine, printer, projector, or electronic white board. This system may use a known storage medium such as a RAM, hard disk, or memory card, as the storage medium 102.

Information devices 111, 121, and 131 respectively include wireless I/Fs 114, 124, and 134 for wireless communication and storage media 113, 123, and 133 for holding various kinds of information including private keys received from the group management system 101. The information devices 111, 121, and 131 respectively hold pieces of identification information 112, 122, and 132 for identifying the respective information devices, e.g., MAC addresses. Note that the wireless I/Fs 114, 124, and 134 may hold the pieces of identification information 112, 122, and 132 in some cases, and the storage media 113, 123, and 133 hold them in other cases. In the first embodiment, the position detection system 105 performs position measurement based on a radio wave transfer delay time, and hence the information device side (111, 121, 131) requires no function associated with position detection. Note, however, that this system includes an illumination receiver when using a method of detecting a position by using illumination, or the information devices 111, 121, and 131 include GPS devices when position detection is to be performed by using GPS. A description common to the information devices 111, 121, and 131 will be made by exemplifying the arrangement of the information device 111. The information device 111 can be implemented by, for example, a personal PC, PDA, or cell phone, and this system can use a known storage medium such as a RAM, hard disk, or memory card as the storage medium 113.

FIG. 2A is a flowchart for explaining a procedure by which the group management system detects the position of an information device and distributes a private key to the position-authenticated information device. The position detection system 105 of the group management system periodically detects the position of an information device in step S212. In step S213, this system performs position authentication to check whether the detected information device is located at a specific position. If the system determines as a result of the position detection that the information device exists in a predetermined range, the system determines that position authentication has succeeded. The process then advances from step S213 to step S214.

In step S214, the group management system 101 and the information device 111 exchange public keys. In step S215, the system performs authentication based on public key encryption. That is, the system encrypts a user ID or password by using the exchanged public key and communicates the resultant information, thereby performing user authentication (to be described in detail later with reference to step S203 in FIG. 2B). If user authentication succeeds, the process advances to step S216 to encrypt the private key used in the group by using the public key and distribute the resultant key from the group management system 101 to the information device 111. Processing to be performed when it is necessary to generate a new group will be described with reference to step S604 in FIG. 6.

Figure 2B:
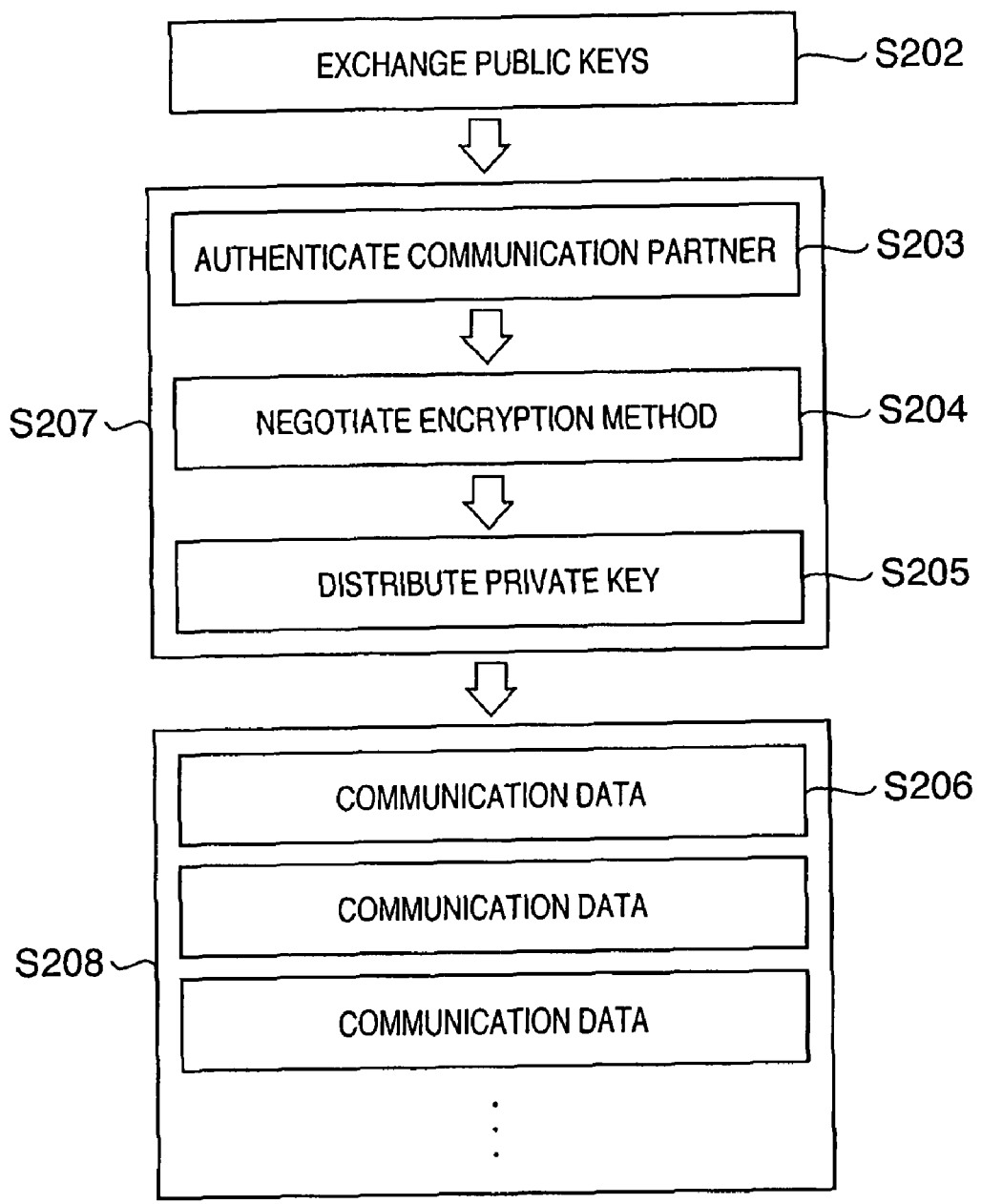
FIG. 2B is a view showing a procedure of securely transmitting a private key from the group management system to an information device which is determined to exist in a predetermined range by a position detection system of the group management system and performing encrypted communication by using the private key.

FIG. 2B is a view expressing a procedure of securely transmitting the private key 107 from the group management system 101 to an information device which is determined to exist in a predetermined range by the position detection system 105 of the group management system 101, and performing encrypted communication using the private key. That is, FIG. 2B is a view for explaining in detail the processing on the information device 111 side after public key exchange in step S214 in FIG. 2A.

As shown in FIG. 2B, this processing comprises two phases, i.e., a phase S207 using public key encryption to distribute a private key and a phase S208 of performing encrypted communication by using an exchanged private key. Although this system may perform all communication by using public key encryption, the method using public key encryption is lower in speed than the method using private key encryption. Therefore, the first embodiment uses public key encryption to exchange private keys, and actually encrypts communication data by the method using the private key.

In step S202, the group management system 101 holding a private key and the information device 111 exchange public keys. In steps S203 to S205 (phase S207), the group management system 101 distributes a private key to the information device using the public key.

In step S203, the information device 111 transmits its own authentication information to the group management system 101 using the public key acquired in step S202, and makes the system perform authentication. For example, on the information device 111 side, the user inputs a user name and password, encrypts them using the public key, and transmits the resultant information to the group management system 101. The group management system 101 decrypts the encoded user name and password, and determines whether the user name is authentic and the password corresponding to the user name is correct. Note that this embodiment may take a form of holding, in the storage medium 113 of the information device in advance, the user name and password used when the user logged on to the system of the information device, without making the user input a user name and password for every authentication, encrypting the user name and the password with the public key, and transmitting the resultant information. The group management system 101 informs the information device 111 that the system is an authentic group management system. The information device 111 checks whether the group management system is a system existing in a group management system list held in the information device.

When both the group management system and the information device authenticate each other in step S203, the group management system 101 informs the information device of an actual communication encryption method upon encrypting it with the public key in step S204. Upon receiving the encryption method, the information device 111 decrypts the encryption method using a decryption key corresponding to the held public key, and stores the decrypted information in the storage medium of the information device 111. In addition, the group management system 101 encrypts the private key 107 shared and used in the group using the public key of the information device 111, and informs the information device 111 of the encrypted private key. Upon receiving this information, the information device 111 decrypts the encrypted private key shared and used in the group using a decryption key corresponding to the public key, and stores the result in the storage medium 133.

Executing steps S202 to S205 described above makes it possible to safely exchange private keys shared and used in the group without letting the third party know them. Actual communication in step S206 and subsequent steps (phase S208) is encrypted and decrypted using private keys shared and used in the group. This embodiment exemplifies the operation associated with updating and distributing private keys. As is understood by those skilled in the art, it suffices to update and distribute the encryption algorithm or update and distribute both the private keys and the encryption algorithm.

Note that the communication in step S206 and subsequent steps may use a method of encrypting communication data using a private key shared and used in the group upon adding information for discriminating whether the data has been tampered or the transmission source has been masqueraded. In addition, identification information is provided for the negotiation of the encryption method and the exchange of the private keys, which have been performed in steps S204 and S205, so as to know that the encryption method and private key shared in the group are updated when they are updated.

Figure 3:
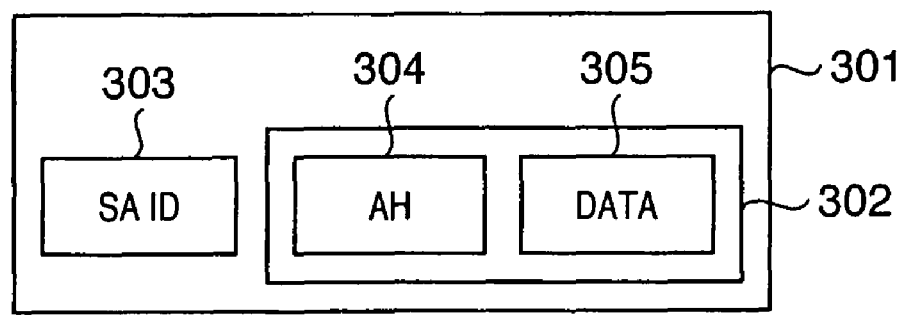
FIG. 3 is a view schematically showing an example of the arrangement of communication data used in intra-group communication which is implemented by the group management system of this embodiment.

FIG. 3 is a view schematically showing an example of the arrangement of communication data 206 used for intra-group communication implemented by the group management system of this embodiment. Reference numeral 301 denotes a portion equivalent to the communication data 206. SAID 303 is information (Security Association ID) for identifying an encryption key or encryption method common to the group. Each information device uses the SAID 303 to discriminate whether the common private key or encryption algorithm currently held by itself is the latest. Reference numeral 302 denotes an actually encrypted portion, which comprises an information (Authentication Header) portion (AH 304) for checking whether the data has been tampered with or the transmission source has been masqueraded, and an actual data portion (data 305). Note that the SAID 303 may have been encrypted. In this case, however, whether the encryption key or encryption algorithm common to the group is updated is checked by discriminating whether the identification information of the SAID 303 can be decoded when the encrypted data is decrypted, instead of comparing the identification information of the SAID 303.

Figure 4:
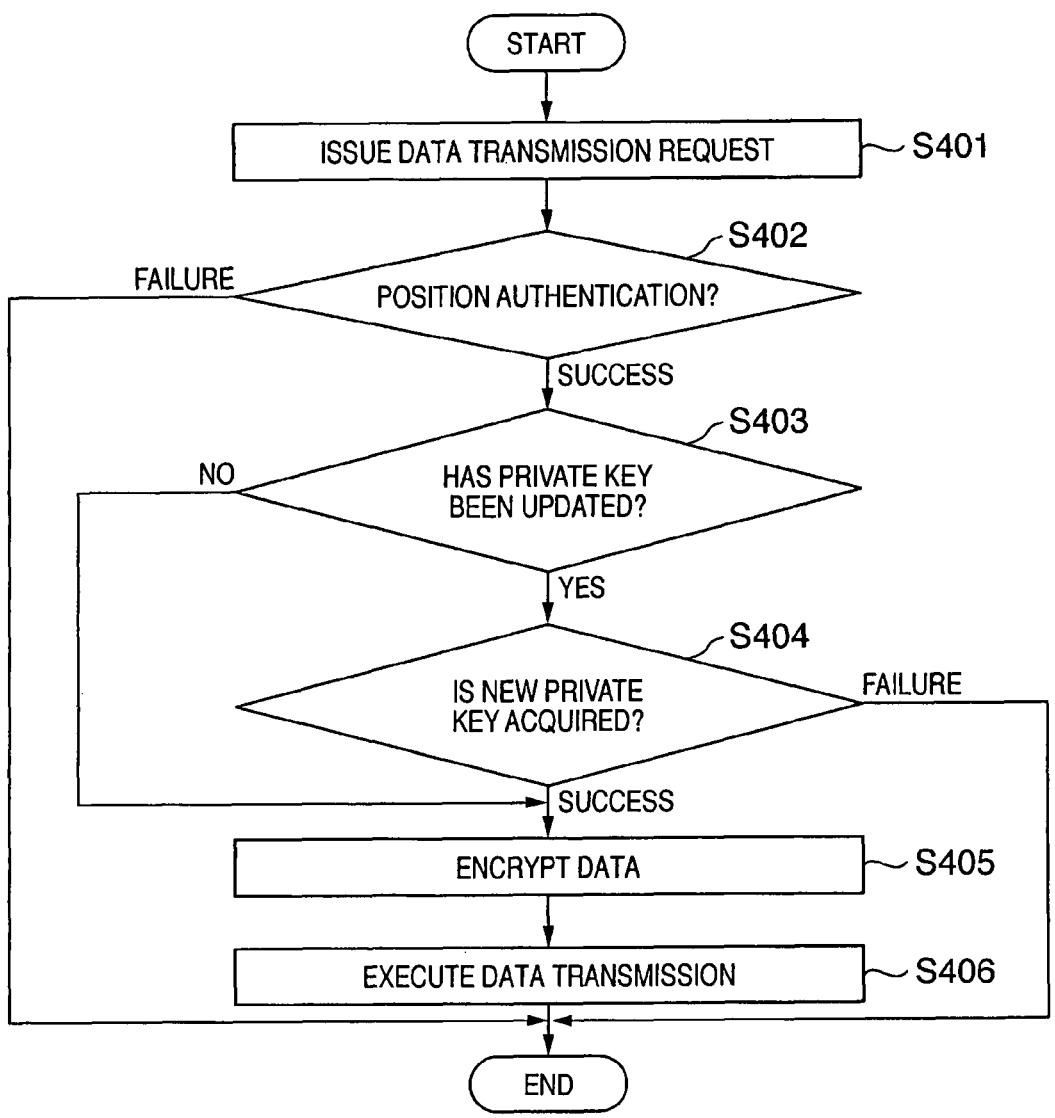
FIG. 4 is a flowchart showing processing to be performed by an information device on the transmission side when the information device transmits data to another information device.

FIG. 4 is a flowchart showing the processing which an information device on the transmission side performs when transmitting data to another information device. Assume that the information device 111 is to transmit data. First of all, in step S401, the information device 111 issues a data transmission request to the group management system 101. In step S402, the information device 111 is subjected to authentication associated with position by the group management system 101. That is, if the position detection system 105 determines that the information device exists within a predetermined range set with respect to the group, authentication associated with position succeeds. If the position detection system 105 determines that the information device exists outside the predetermined range, authentication associated with position fails.

When the information device 111 receives the information of authentication success associated with position from the group management system 101, the process advances to step S403. If the system notifies the information device of authentication failure associated with position (including the case wherein the information device receives no response from the group management system 101 (i.e., it can be regarded that the information device has moved outside the reachable range of radio waves)), the information device terminates the processing, and hence transmits no data. In step S403, the information device 111 on the transmission side inquires of the group management system 101 whether the private key for communication encryption has been updated. This determination can be performed, for example, by acquiring the previous update time 103 of the private key and comparing it with the update time in the information device. Alternatively, the information device may acquire SAID to detect that the private key has been updated.

If it is determined in step S403 that the private key for communication encryption has not been updated, the process advances to step S405. If it is determined that the private key for communication encryption has been updated, the process advances to step S404 to acquire the private key, which the group management system 101 holds, by the method (phase S207) using public key encryption shown in FIG. 2. If the authentication fails in step S203, the information device terminates this processing without transmitting any data. If it is determined in step S404 that the acquisition of a new private key has succeeded, the process advances to step S405.

In step S405, the information device on the transmission side encrypts data using the private key for communication encryption which the device holds. In step S406, the information device transmits the data encrypted in step S405 to the information device at the transmission destination.

With the above processing, only when the information device exists within the predetermined range, the encryption key (private key) (and/or the encryption algorithm) is updated as needed, and data is encrypted using the key and is transmitted. Note that in the above processing by the information device, the group management system 101 executes position authentication in accordance with a data transmission request, and needs to execute the processing for exchanging encryption keys. Since these processes are obvious from the description made with reference to FIGS. 2A and 2B, a description thereof will be omitted.

Figure 5:
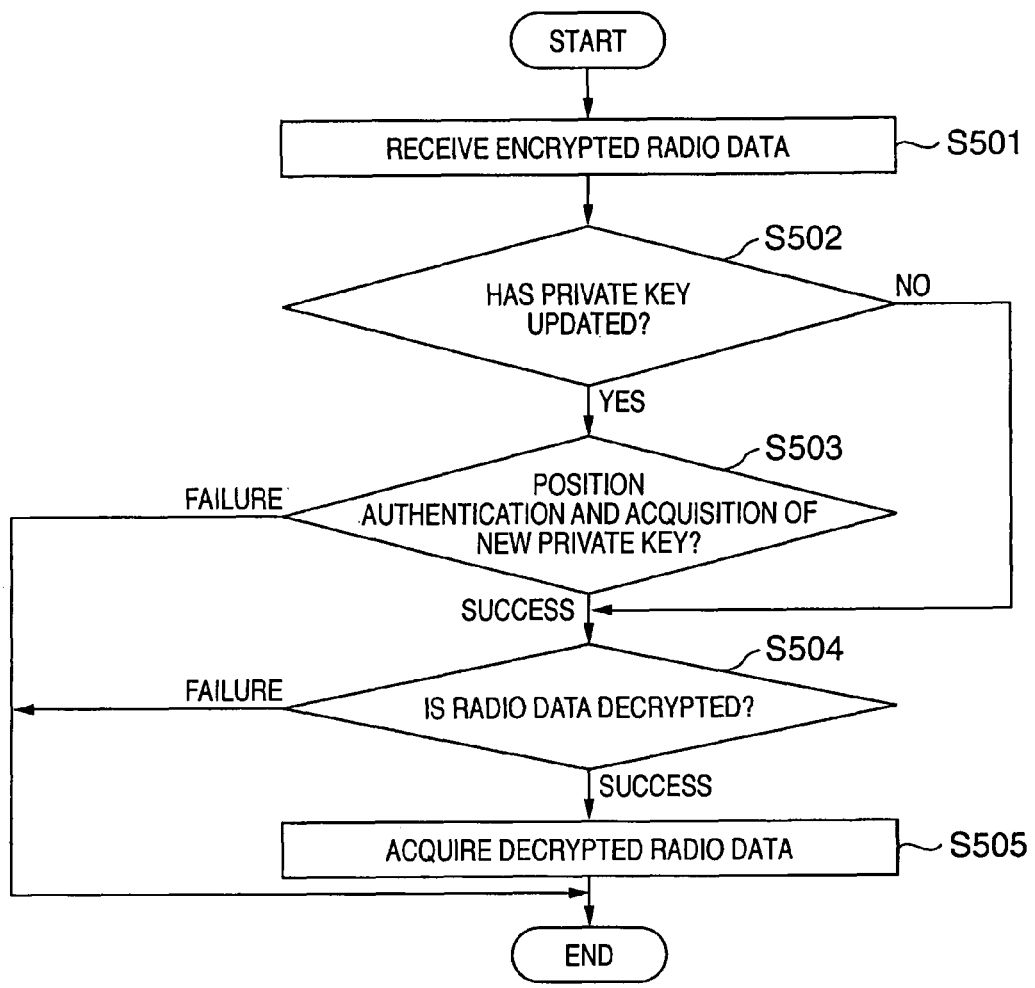
FIG. 5 is a flowchart showing processing to be performed when an information device receives encrypted data from another information device.

FIG. 5 is a flowchart showing the processing to be performed when a given information device receives encrypted data from another information device. First of all, when receiving encrypted radio data in step S501, the information device determines in step S502 whether the private key for communication encryption has been updated. For example, comparing the SAID 303 contained in the communication data with the information which the storage medium of the information device holds makes it possible to determine whether the private key has been updated.

If the information device determines that the private key has not been updated, the process advances to step S504. If the information device determines that the private key has been updated, the process advances to step S503 to acquire the updated private key from the group management system 101. That is, the information device acquires the new private key from the group management system 101 by the method using the public key encryption shown in the phase S207 in FIG. 2. Note that in this case, the group management system 101 performs position authentication based on the position detection result obtained by the position detection system 105, and does not exchange any private keys if the information device does not exist in a predetermined range.

If the information device has failed to acquire a new private key ("NG" in the position authentication and the authentication has failed in step S203 in FIG. 2B), the device terminates this processing, and does not decrypt the received data. If the acquisition of a new private key succeeds, the process advances from step S503 to step S504.

In step S504, the information device on the data reception side decrypts the data received in step S501 using the private key held in the storage medium of the device. If the decryption succeeds, the process advances to step S505 to acquire the decrypted radio data and supply it for predetermined processing. In contrast, if the decryption of the radio data fails, the information device terminates this processing. If, for example, the key is updated when the information device tries to decrypt the data using the key, the decryption fails. If the decryption succeeds, the process advances to step S505, in which the information device can acquire the decrypted radio data.

In this case, the two words "encryption" and "decryption" are used. Since the first embodiment performs encryption and decryption by using the same private key, the algorithm and key for encryption are the same as those for decryption.

Figure 6:
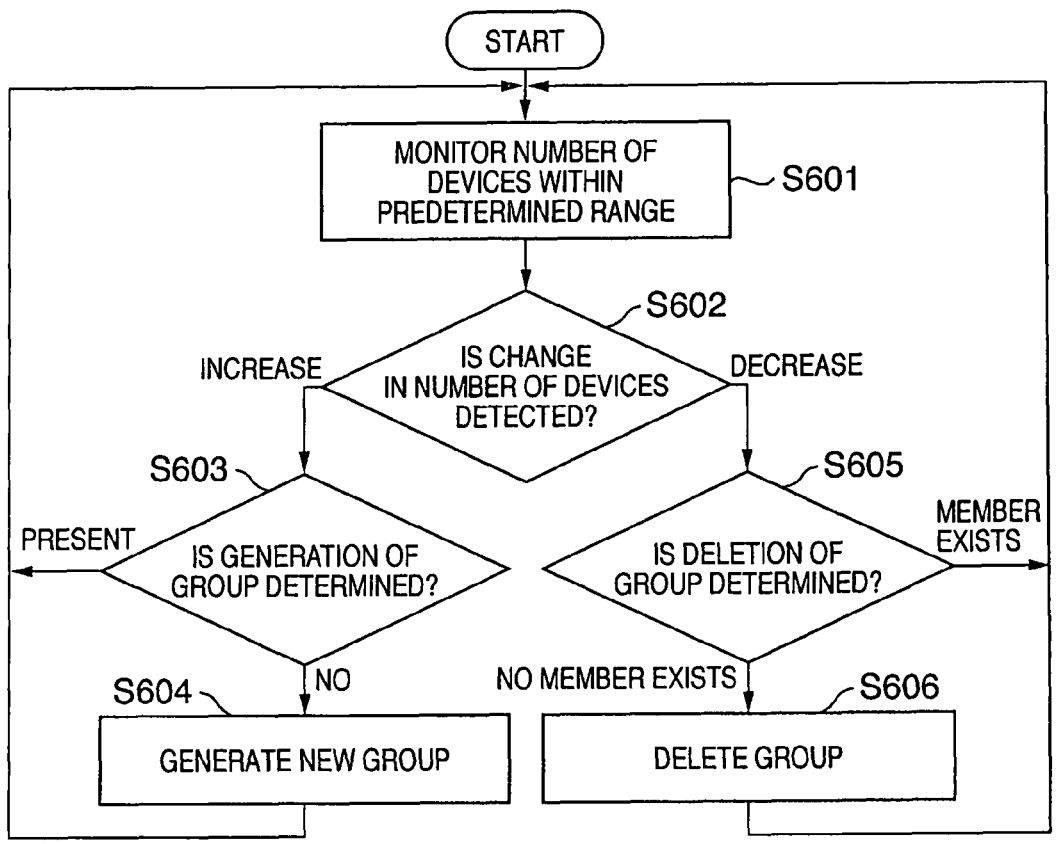
FIG. 6 is a flowchart for discriminating the generation and deletion of a group by the group management system 101 in the first embodiment.

FIG. 6 is a flowchart for causing the group management system 101 in the first embodiment to discriminate the generation or deletion of a group. In step S601, the group management system 101 monitors the number of devices within a predetermined range. That is, the position detection system 105 detects information devices existing in a predetermined position range and monitors the number of devices. If the position detection system 105 detects that the number of devices in the above range has increased, the process advances from step S602 to step S603. If the position detection system 105 detects that the number of devices has decreased, the process advances from step S602 to step S605.

If the number of information devices in the predetermined range has increased and a group with respect to the range which the group management system 101 is monitoring has already existed, the process returns from step S603 to step. S601. If no group has been generated, the process advances to step S604 to generate a new group with respect to the range. When generating this new group, the group management system 101 generates an algorithm and private key for the encryption of a data communication path for this group and holds the resultant information in the storage medium 102. The process returns from step S604 to step S601.

If the number of devices within the predetermined range has decreased, the process advances to step S605 to determine whether to delete the group. If no member of the group exists in the predetermined range, the process advances to step S606 to delete the group. In addition, if only a built-in device registered in the group management system 101 exists in the predetermined range, the group is deleted. In this case, the built-in device is a printer, copying machine, projector, electronic white board, or the like, which always exists in a normal operation state in a given range. Whether a given device is a built-in device may be determined by using a scheme of holding an attribute indicating a built-in device in a storage medium on the built-in device side and replying information indicating that the given device is the built-in device, in response to an inquiry from the group management system 101 in step S605. In step S605, the group management system 101 also determines to delete the group, when the built-in device is the only information device within the range monitored by the group management system 101. The process then advances to step S606. When the system completes the deletion of the group, the process returns to step S601. If at least one information device other than the built-in device exists in the range, the process returns from step S605 to step S601.

Figure 7:
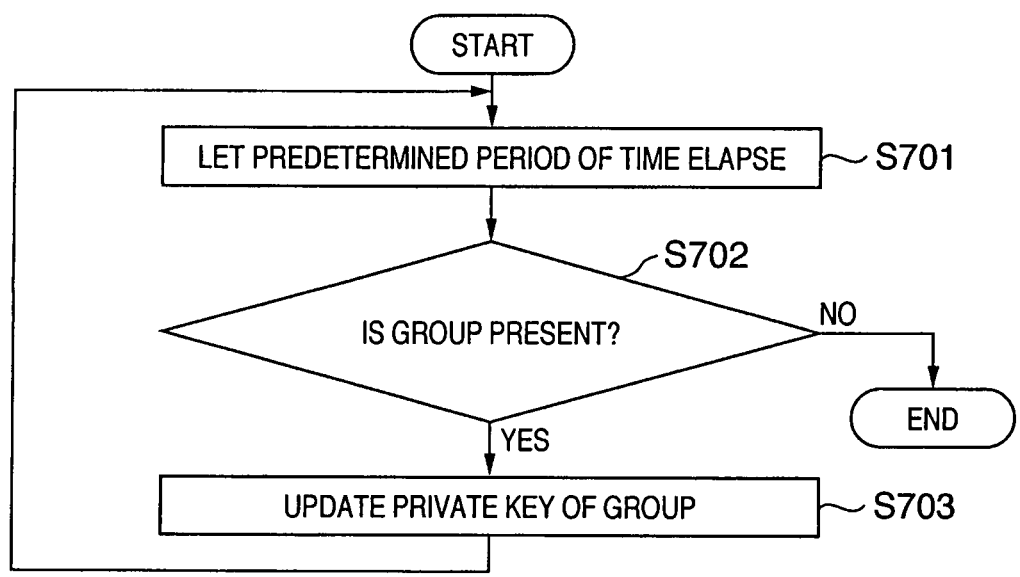
FIG. 7 is a flowchart showing the processing of causing the group management system of the first embodiment to update an algorithm and private key for the encryption of communication in a group at predetermined time intervals.

FIG. 7 is a flowchart showing the processing which the group management system 101 of the first embodiment performs to update a private key for the encryption of communication in the group at predetermined intervals. When a predetermined period of time has elapsed in step S701, the process advances to step S702. Note that determining whether a predetermined period of time has elapsed since the previous update time 103 makes it possible determine whether the predetermined period of time has elapsed. In step S702, the system discriminates whether any group exists. If the result is NO in step S702, the system stops updating the private key 107. If the result is YES in step S702, the process advances to step S703 to update the private key for the encryption of communication in the group. Upon completion of the updating operation, the process returns to step S701 to wait until a predetermined period time elapses again. Although FIG. 7 shows the flowchart for discriminating whether any group exists and stopping the updating of the key, this system may use a method of stopping the updating of a private key at the time of deletion of a group. As described above, the system may periodically update a key as shown in FIG. 7, or may update a key when a given information device transmits data to another information device.

FIG. 8 shows a table held as group information 104 of the group management system 101. This table holds information associated with each member of a group, e.g., an information terminal name, a position, the identification information of the information terminal, and information indicating whether the device is a built-in device.

Note that the first embodiment can prevent tapping using a previously acquired key by sufficiently shortening the update intervals for an algorithm and key for the encryption of communication in a group.

<Second Embodiment>

A characteristic feature of the second embodiment is that a group management system updates a private key based on a change in the number of information devices in a range which the system is monitoring. Note that the arrangement of the system is the same as that in the first embodiment. A mechanism for secure automatic key distribution and the form of encrypted communication data are also the same as those in the first embodiment. In addition, the process of making an information device on the data transmission side transmit data upon encrypting it and the process of making an information device on the data reception side receive and decrypt data are the same as the process (FIGS. 4 and 5) in the first embodiment. Furthermore, this embodiment uses the same group information table as that in the first embodiment (FIG. 8).

The algorithm for generating/deleting a group and encrypting communication in a group and the method of updating a private key in the first embodiment differ from those in the second embodiment, and hence such differences will be described below with reference to FIG. 9. Although the second embodiment will exemplify the technique of updating a private key, an encryption algorithm and an arrangement for updating a private key and the encryption algorithm are obvious from the description of this embodiment.

Figure 9:
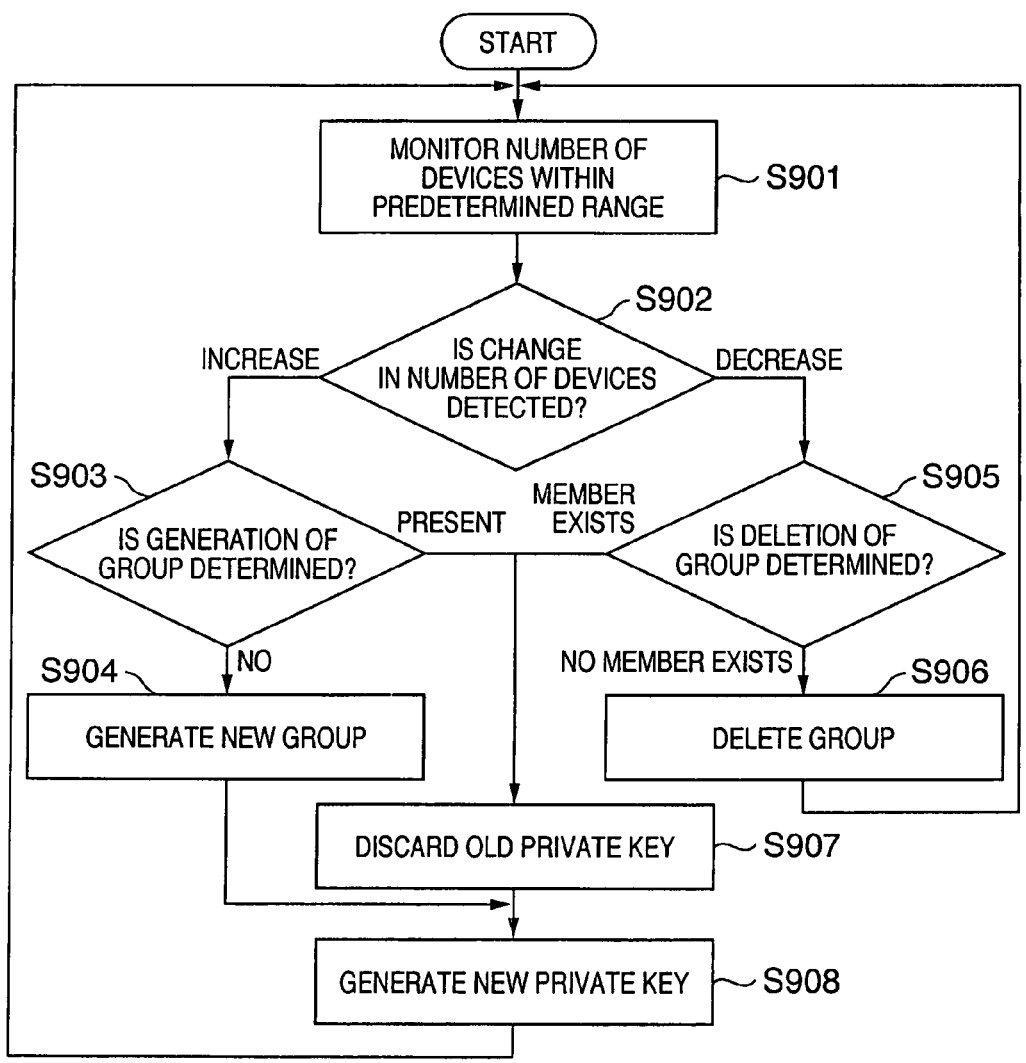
FIG. 9 is a flowchart showing the processing of generating/deleting a group and updating an algorithm and private key for the encryption of communication in a group in accordance with a change in the number of information devices within the range which a group management system according to the second embodiment is monitoring.

FIG. 9 is a flowchart showing the processing of generating/deleting a group and updating a private key for encryption of communication in a group in accordance with a change in the number of information devices in the range which the group management system is monitoring.

In step S901, a group management system 101 is monitoring the number of information devices within a predetermined range. In step S902, the system detects a change in the number of devices in the predetermined range. If the number of devices has increased, the process branches to step S903. If the number of devices has decreased, the process branches to step S905.

If the number of devices within the predetermined range has increased, it is determined in step S903 whether a new group is to be generated. If a group has already been generated in the range which the group management system 101 is monitoring, the process advances to step S907 to discard the old private key for the encryption of communication in the group. In step S908, the system generates a new private key, and the process returns to step S901. In contrast, if it is determined in step S903 that no group has been generated in the monitored range, the process advances to step S904 to generate a new group. In step S908, the system generates a new private key for the encryption of communication in the group. The process returns to step S901.

When detecting in step S902 that the number of information devices has decreased, the system determines in step S905 whether the group is to be deleted. If any member of the group exists, the process advances to step S907 to discard the old private key once. In step S908, the system generates a new private key. The process returns to step S901. If no member of the group exists in step S905, or only the built-in device exists as in the first embodiment, the system deletes the group in step S906.

As described above, the second embodiment updates the algorithm and key for the encryption of communication in a group every time the number of information devices changes. This makes it impossible to decrypt radio data outside the range which the group management system is monitoring using the previously acquired private key.

Third Embodiment

A characteristic feature of the third embodiment is that it allows manual operation for participation in a group. FIG. 10 is a view schematically showing the relationship between information devices, a radio reachable range, and the range which a group management system is monitoring.

The inside of a circle 1001 is the range in which radio waves can reach (to be referred to as the radio reachable range 1001 hereinafter). The inside of the range enclosed with a rectangle 1002 (to be referred to as the limited range 1002 hereinafter). In the case shown in FIG. 10, an information device 1, i.e., 1003, an information device 2, i.e., 1004, an information device 3, i.e., 1005, and a built-in device 1006 exist in the inside of the limited range, and an information device 4, i.e., 1007, exists outside the limited range in the radio reachable range.

FIG. 11 shows a user interface by which the user of a group management system 101 designates whether to admit a given device as a member of a group. For example, the display device and pointing device of the group management system 101 provide this user interface. This is a table comprising a field for checking whether to allow a given device to participate in a group and the name of the device. With regard to the information device 4, i.e., 1007, which exists outside the limited range 1002 in the radio reachable range 1001, since the device cannot be a member of the group inside the limited range, this system does not present the device to the user. That is, the system presents only the information devices existing in the limited range 1002 inside the radio reachable range 1001 to the user. This makes it possible to narrow down the choices for the user and improve the operability for the user. In addition, with regard to a built-in device, when the only member of the group is the built-in device, the system deletes the group. This makes it possible to discriminate the built-in device from other information devices. For example, the built-in device is always set in a selected state in the user interface in FIG. 11 to inhibit the user from operation.

The following are the effects of the respective embodiments described above.

First of all, when forming a secure information sharing group by radio within a limited range using the conventional technique, the user needs to manually perform operation associated with participation/separation in/from a group, and in particular, distribution and management of encryption keys. This imposes a heavy load on the user. In contrast, this embodiment can automatically perform operation associated with participation and separation in/from a group, and in particular, distribution and management of encryption keys, when forming a secure information sharing group within a limited radio range. This makes it possible to improve the convenience for the user. Only the activity of entering a given limited range allows the user to participate in a secure information sharing group.

Since this system receives radio waves from a device in a range which is not intended by the user, e.g., an adjoining office or room, the system may display the device as a candidate for a member of a group on a list window. In addition, tapping may take place from a location which is not intended by the members of a group. Even in such a group environment, this embodiment encrypts wireless communication, and hence can prevent anyone who intercepts radio waves from tapping the communication. In addition, with regard to communication encryption, someone may tap using an acquired key from a range in which radio waves can reach. That is, someone who has acquired a private key may perform so-called "spoofing", i.e., intercepting radio waves from a location which is not intended by the members of the group and decrypting information using the private key. In contrast, this embodiment updates a private key for the encryption of wireless communication as needed, and hence can prevent "spoofing". In addition, since the embodiment automatically performs above updating and distribution operation for a private key, it can reduce the load associated with security on the user.

The above embodiment can improve security by performing authentication of a communication partner, negotiation of an encryption method, and distribution of a private key using public key encryption in distributing a key for the encryption of wireless communication. Automatically performing this operation can improve convenience for the user. In addition, the frequency of key updating can be increased, and hence can further improve the security.

When a set group is to be canceled and a built-in device always exists in a predetermined range, the user must manually cancel the group with respect to the built-in device. This imposes a load on the user. In contrast to this, the above embodiment can discriminate whether a given device is a built-in device, and can automatically generate and cancel a group even if a built-in device exists in a given range.

When the user selects an information device which is to participate in a group, any information device which exists outside a limited range is not displayed as a choice. This improves operability for the user.

The present invention incorporates a case wherein software for implementing the functions of the embodiments described above (programs corresponding to the flowcharts shown in the accompanying drawings in the embodiments) are directly or remotely supplied to a system or apparatus to cause the computer of the system or apparatus to read out and execute the programs, thereby implementing the functions.

The program codes themselves which are installed in the computer to allow the computer to implement the functions/processing of the present invention also implement the present invention. That is, the computer programs themselves, which implement the functions/processing of the present invention, are also incorporated in the present invention.

In this case, each program may take any form, e.g., an object code, a program executed by an interpreter, and script data supplied to an OS, as long as it has the function of the program.

As a recording medium for supplying the programs, a floppy (registered trademark) disk, hard disk, optical disk, magnetooptical disk, MO, CD-ROM, CD-R, CD-RW, magnetic tape, nonvolatile memory card, ROM, DVD (DVD-ROM or DVD-R), or the like can be used.

In addition, methods of supplying the programs include the following. A client computer connects to a homepage on the Internet using a browser to download each computer program of the present invention from the homepage or download a compressed file containing an automatic install function into a recording medium such as a hard disk. Alternatively, the programs can be supplied by dividing the program codes constituting each program of the present invention into a plurality of files, and downloading the respective files from different homepages. That is, the present invention also incorporates a WWW server which allows a plurality of users to download program files for causing the computer to execute the functions/processing of the present invention.

In addition, the functions/processing of the present invention can be implemented by encrypting the programs of the present invention, storing the encrypted data in storage media such as CD-ROMs, distributing them to users, allowing users who satisfy a predetermined condition to download key information for decryption from a homepage through the Internet, executing the encrypted programs using the key information, and allowing a computer to install the programs.

The functions of the above embodiment are implemented not only when the readout programs are executed by the computer but also when the OS running on the computer performs all or part of the actual processing based on the instructions of the programs.

The functions of the above embodiment are also implemented when the programs read out from the storage medium are written in the memory of a function expansion board inserted into the computer or a function expansion unit connected to the computer, and the CPU of the function expansion board or function expansion unit performs all or part of the actual processing based on the instructions of the programs.

When forming an information sharing group within a limited range by using secure radio waves, the present invention can automatically perform operation associated with participation in a group and distribution and management of encryption keys, thereby improving convenience for the user. For example, only the activity of entering a given limited range allows the user to participate in a secure information sharing group, and participation in the group and acquisition of encryption keys are automatically performed, thereby improving convenience for the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

CLAIM OF PRIORITY

This application claims the benefit of Japanese Patent Application No. 2004-241197, filed Aug. 20, 2004 which is hereby incorporated by reference herein in its entirety.

The invention claimed is:

1. A group management apparatus which manages a group in which one or a plurality of information processing apparatuses connect to each other by wireless communication, the apparatus comprising:
   a detection unit configured to detect a position of an information processing apparatus;
   a determination unit configured to determine, based on the detection unit, whether the information processing apparatus exists in a predetermined range;
   a notification unit configured to notify the information processing apparatus of an encryption key to be used in the group, when the determination unit determines that the information processing apparatus exists in the predetermined range;
   a holding unit configured to hold a table indicating an attribute of an information processing apparatus belonging to the group, the attribute including: a terminal name, a position of the apparatus, identification information, and type information indicative of whether or not the apparatus is a built-in device that is not mobile;

a discrimination unit configured to discriminate whether an information processing apparatus which exists in the predetermined range is a built-in device based on the attribute indicated by the table;

a cancellation unit configured to cancel the group when only an information processing apparatus determined to be a built-in device exists in the predetermined range; and a generation unit configured to generate a new group of a plurality of information processing apparatuses when it is detected, based on a position detection result obtained by the detection unit, that a number of information processing apparatuses existing in the predetermined range has changed after the cancellation unit cancels the group, the new group using a new encryption key different from the encryption key used before the cancellation unit cancelled the group.

2. The group management apparatus according to claim 1, further comprising an authentication unit configured to perform user authentication when the determination unit determines that the information processing apparatus exists in the predetermined range,
wherein the notification unit notifies the information processing apparatus of an encryption key to be used in the group, when the authentication unit has succeeded authentication.

3. The group management apparatus according to claim 1, further comprising an updating unit configured to update the encryption key every time a predetermined period of time elapses.

4. The group management apparatus according to claim 1, further comprising an updating unit configured to update the encryption key when detecting, based on the position detection result obtained by the detection unit, that the number of information processing apparatuses existing in the predetermined range has changed.

5. The group management apparatus according to claim 1, wherein the cancellation unit cancels the group when no information processing apparatus exists in the predetermined range.

6. The group management apparatus according to claim 1, further comprising
a display unit configured to display information processing apparatuses existing in the predetermined range, and
a selection unit configured to select an information processing apparatus, of the information processing apparatuses displayed by the display unit, which participates in the group.

7. The group management apparatus according to claim 1, wherein the built-in device that is not mobile comprises at least one of copying machine, printer, projector, or electronic white board.

8. The group management apparatus according to claim 1, further comprising:
a monitoring unit configured to monitor the number of the information processing apparatuses within the predetermined range to detect whether the number of the information processing apparatuses increased or decreased;
a first judging unit configured to judge whether or not a group exists in the predetermined range when it is detected that the number of the information processing apparatuses increased; and
a second judging unit configured to judge whether or not there is an information processing apparatus in the predetermined range when it is detected that the number of the information processing apparatuses decreased,
wherein:
the generation unit generates the new group when it is judged by the first judging unit that no group exists in the predetermined range; and
the cancelation unit cancels the group when it is judged by the second judging unit that there is no information processing apparatus in the predetermined range or when an information processing apparatus determined to be a built-in device exists in the predetermined range.

9. A group management apparatus which manages a group in which one or a plurality of information processing apparatuses connect to each other by wireless communication, the apparatus comprising:
a detection unit configured to detect a position of an information processing apparatus;
a determination unit configured to determine, based on the detection unit, whether the information processing apparatus exists in a predetermined range;
an authentication unit configured to perform user authentication using a first encryption key when the determination unit determines that the information processing apparatus exists in the predetermined range;
a notification unit configured to notify the information processing apparatus of a second encryption key to be used in the group, when the authentication unit has succeeded authentication;
a communication unit configured to execute communication in the group using the second encryption key;
a holding unit configured to hold a table indicating an attribute of an information processing apparatus belonging to the group, the attribute including: a terminal name, a position of the apparatus, identification information, and type information indicative of whether or not the apparatus is a built-in device that is not mobile;
a discrimination unit configured to discriminate whether an information processing apparatus which exists in the predetermined range is a built-in device based on the attribute indicated by the table;
a cancellation unit configured to cancel the group when only an information processing apparatus determined to be a built-in device exists in the predetermined range; and
a generation unit configured to generate a new group of a plurality of information processing apparatuses when it is detected, based on a position detection result obtained by the detection unit, that a number of information processing apparatuses existing in the predetermined range has changed after the cancellation unit cancels the group, the new group using a new encryption key different from the second encryption key used before the cancellation unit cancelled the group.

10. The group management apparatus according to claim 9, further comprising:
a monitoring unit configured to monitor the number of the information processing apparatuses within the predetermined range to detect whether the number of the information processing apparatuses increased or decreased;
a first judging unit configured to judge whether or not a group exists in the predetermined range when it is detected that the number of the information processing apparatuses increased; and
a second judging unit configured to judge whether or not there is an information processing apparatus in the predetermined range when it is detected that the number of the information processing apparatuses decreased, wherein:
the generation unit generates the new group when it is judged by the first judging unit that no group exists in the predetermined range; and
the cancelation unit cancels the group when it is judged by the second judging unit that there is no information processing apparatus in the predetermined range or when an information processing apparatus determined to be a built-in device exists in the predetermined range.

11. A group management method of managing a group in which one or a plurality of information processing apparatuses connect to each other by wireless communication, the method comprising:
a detection step of detecting a position of an information processing apparatus;
a determination step of determining, based on the detection step, whether the information processing apparatus exists in a predetermined range;
a notification step of notifying the information processing apparatus of an encryption key to be used in the group, when it is determined in the determination step that the information processing apparatus exists in the predetermined range;
a holding step of holding a table indicating an attribute of an information processing apparatus belonging to the group, the attribute including: a terminal name, a position of the apparatus, identification information, and type information indicative of whether or not the apparatus is a built-in device that is not mobile;
a discrimination step of discriminating whether an information processing apparatus which exists in the predetermined range is a built-in device based on the attribute indicated by the table;
a cancellation step of canceling the group when only an information processing apparatus determined to be a built-in device exists in the predetermined range; and
a generation step of generating a new group of a plurality of information processing apparatuses when it is detected, based on a position detection result obtained in the detection step, that a number of information processing apparatuses existing in the predetermined range has changed after the group is cancelled in the cancellation step, the new group using a new encryption key different from the encryption key used before the group is cancelled in the cancellation step.

12. The group management method according to claim 11, further comprising:
a monitoring step of monitoring the number of the information processing apparatuses within the predetermined range to detect whether the number of the information processing apparatuses increased or decreased;
a first judging step of judging whether or not a group exists in the predetermined range when it is detected that the number of the information processing apparatuses increased; and
a second judging step of judging whether or not there is an information processing apparatus in the predetermined range when it is detected that the number of the information processing apparatuses decreased,
wherein:
the generation step generates the new group when it is judged in the first judging step that no group exists in the predetermined range; and
the cancellation step cancels the group when it is judged in the second judging step that there is no information processing apparatus in the predetermined range or when an information processing apparatus determined to be a built-in device exists in the predetermined range.

13. A group management method of managing a group in which one or a plurality of information processing apparatuses connect to each other by wireless communication, the method comprising:
a detection step of detecting a position of an information processing apparatus;
a determination step of determining, based on the detection step, whether the information processing apparatus exists in a predetermined range;
an authentication step of performing user authentication using a first encryption key when it is determined in the determination step that the information processing apparatus exists in the predetermined range;
a notification step of notifying the information processing apparatus of a second encryption key to be used in the group, when authentication has succeeded in the authentication step;
a communication step of executing communication in the group using the second encryption key;
a holding step of holding a table indicating an attribute of an information processing apparatus belonging to the group, the attribute including: a terminal name, a position of the apparatus, identification information, and type information indicative of whether or not the apparatus is a built-in device that is not mobile;
a discrimination step of discriminating whether an information processing apparatus which exists in the predetermined range is a built-in device based on the attribute indicated by the table;
a cancellation step of canceling the group when only an information processing apparatus determined to be a built-in device exists in the predetermined range; and
a generation step of generating a new group of a plurality of information processing apparatuses when it is detected, based on a position detection result obtained in the detection step, that a number of information processing apparatuses existing in the predetermined range has changed after the group is cancelled in the cancellation step, the new group using a new encryption key different from the second encryption key used before the group is cancelled in the cancellation step.

14. The group management method according to claim 13, further comprising:
a monitoring step of monitoring the number of the information processing apparatuses within the predetermined range to detect whether the number of the information processing apparatuses increased or decreased;
a first judging step of judging whether or not a group exists in the predetermined range when it is detected that the number of the information processing apparatuses increased; and
a second judging step of judging whether or not there is an information processing apparatus in the predetermined range when it is detected that the number of the information processing apparatuses decreased,
wherein:
the generation step generates the new group when it is judged in the first judging step that no group exists in the predetermined range; and
the cancellation step cancels the group when it is judged in the second judging step that there is no information processing apparatus in the predetermined range or when an information processing apparatus determined to be a built-in device exists in the predetermined range.

15. A computer program stored on a computer-readable storage medium which causes a computer to execute an information processing method of managing a group in which one or a plurality of information processing apparatuses connect to each other by wireless communication, the information processing method comprising:
- a detection step of detecting a position of an information processing apparatus;
- a determination step of determining, based on the detection step, whether the information processing apparatus exists in a predetermined range;
- a notification step of notifying the information processing apparatus of an encryption key to be used in the group, when it is determined in the determination step that the information processing apparatus exists in the predetermined range;
- a holding step of holding a table indicating an attribute of an information processing apparatus belonging to the group, the attribute including: a terminal name, a position of the apparatus, identification information, and type information indicative of whether or not the apparatus is a built-in device that is not mobile;
- a discrimination step of discriminating whether an information processing apparatus which exists in the predetermined range is a built-in device based on the attribute indicated by the table;
- a cancellation step of canceling the group when only an information processing apparatus determined to be a built-in device exists in the predetermined range; and
- a generation step of generating a new group of a plurality of information processing apparatuses when it is detected, based on a position detection result obtained in the detection step, that a number of information processing apparatuses existing in the predetermined range has changed after the group is cancelled in the cancellation step, the new group using a new encryption key different from the encryption key used before the group is cancelled in the cancellation step.

16. The computer program according to claim 15, the information processing method further comprising:
- a monitoring step of monitoring the number of the information processing apparatuses within the predetermined range to detect whether the number of the information processing apparatuses increased or decreased;
- a first judging step of judging whether or not a group exists in the predetermined range when it is detected that the number of the information processing apparatuses increased; and
- a second judging step of judging whether or not there is an information processing apparatus in the predetermined range when it is detected that the number of the information processing apparatuses decreased, wherein:
the generation step generates the new group when it is judged in the first judging step that no group exists in the predetermined range; and
the cancellation step cancels the group when it is judged in the second judging step that there is no information processing apparatus in the predetermined range or when an information processing apparatus determined to be a built-in device exists in the predetermined range.

17. A computer program stored on a computer-readable storage medium which causes a computer to execute an information processing method of managing a group in which one or a plurality of information processing apparatuses connect to each other by wireless communication, the information processing method comprising:
- a detection step of detecting a position of an information processing apparatus;
- a determination step of determining, based on the detection step, whether the information processing apparatus exists in a predetermined range;
- an authentication step of performing user authentication using a first encryption key when it is determined in the determination step that the information processing apparatus exists in the predetermined range;
- a notification step of notifying the information processing apparatus of a second encryption key to be used in the group, when authentication has succeeded in the authentication step;
- a communication step of executing communication in the group using the second encryption key;
- a holding step of holding a table indicating an attribute of an information processing apparatus belonging to the group, the attribute including: a terminal name, a position of the apparatus, identification information, and type information indicative of whether or not the apparatus is a built-in device that is not mobile;
- a discrimination step of discriminating whether an information processing apparatus which exists in the predetermined range is a built-in device based on the attribute indicated by the table;
- a cancellation step of canceling the group when only an information processing apparatus determined to be a built-in device exists in the predetermined range; and
- a generation step of generating a new group of a plurality of information processing apparatuses when it is detected, based on a position detection result obtained in the detection step, that a number of information processing apparatuses existing in the predetermined range has changed after the group is cancelled in the cancellation step, the new group using a new encryption key different from the second encryption key used before the group is cancelled in the cancellation step.

18. The computer program according to claim 17, the information processing method further comprising:
- a monitoring step of monitoring the number of the information processing apparatuses within the predetermined range to detect whether the number of the information processing apparatuses increased or decreased;
- a first judging step of judging whether or not a group exists in the predetermined range when it is detected that the number of the information processing apparatuses increased; and
- a second judging step of judging whether or not there is an information processing apparatus in the predetermined range when it is detected that the number of the information processing apparatuses decreased, wherein:
the generation step generates the new group when it is judged in the first judging step that no group exists in the predetermined range; and
the cancellation step cancels the group when it is judged in the second judging step that there is no information processing apparatus in the predetermined range or when an information processing apparatus determined to be a built-in device exists in the predetermined range.

19. A computer-readable storage medium storing a computer program which causes a computer to execute an information processing method of managing a group in which one or a plurality of information processing apparatuses connect to each other by wireless communication, the information processing method comprising:

a detection step of detecting a position of an information processing apparatus;

a determination step of determining, based on the detection step, whether the information processing apparatus exists in a predetermined range;

a notification step of notifying the information processing apparatus of an encryption key to be used in the group, when it is determined in the determination step that the information processing apparatus exists in the predetermined range;

a holding step of holding a table indicating an attribute of an information processing apparatus belonging to the group, the attribute including: a terminal name, a position of the apparatus, identification information, and type information indicative of whether or not the apparatus is a built-in device that is not mobile;

a discrimination step of discriminating whether an information processing apparatus which exists in the predetermined range is a built-in device based on the attribute indicated by the table;

a cancellation step of canceling the group when only an information processing apparatus determined to be a built-in device exists in the predetermined range; and a generation step of generating a new group of a plurality of information processing apparatuses when it is detected, based on a position detection result obtained in the detection step, that a number of information processing apparatuses existing in the predetermined range has changed after the group is cancelled in the cancellation step, the new group using a new encryption key different from the encryption key used before the group is cancelled in the cancellation step.

20. The computer-readable storage medium according to claim 19, the information processing method further comprising:

a monitoring step of monitoring the number of the information processing apparatuses within the predetermined range to detect whether the number of the information processing apparatuses increased or decreased;

a first judging step of judging whether or not a group exists in the predetermined range when it is detected that the number of the information processing apparatuses increased; and a second judging step of judging whether or not there is an information processing apparatus in the predetermined range when it is detected that the number of the information processing apparatuses decreased, wherein:

the generation step generates the new group when it is judged in the first judging step that no group exists in the predetermined range; and the cancellation step cancels the group when it is judged in the second judging step that there is no information processing apparatus in the predetermined range or when an information processing apparatus determined to be a built-in device exists in the predetermined range.

21. A computer-readable storage medium storing a computer program which causes a computer to execute an information processing method of managing a group in which one or a plurality of information processing apparatuses connect to each other by wireless communication, the information processing method comprising:

a detection step of detecting a position of an information processing apparatus;

a determination step of determining, based on the detection step, whether the information processing apparatus exists in a predetermined range;

an authentication step of performing user authentication using a first encryption key when it is determined in the determination step that the information processing apparatus exists in the predetermined range;

a notification step of notifying the information processing apparatus of a second encryption key to be used in the group, when authentication has succeeded in the authentication step;

a communication step of executing communication in the group using the second encryption key;

a holding step of holding a table indicating an attribute of an information processing apparatus belonging to the group, the attribute including: a terminal name, a position of the apparatus, identification information, and type information indicative of whether or not the apparatus is a built-in device that is not mobile;

a discrimination step of discriminating whether an information processing apparatus which exists in the predetermined range is a built-in device based on the attribute indicated by the table;

a cancellation step of canceling the group when only an information processing apparatus determined to be a built-in device exists in the predetermined range; and a generation step of generating a new group of a plurality of information processing apparatuses when it is detected, based on a position detection result obtained in the detection step, that a number of information processing apparatuses existing in the predetermined range has changed after the group is cancelled in the cancellation step, the new group using a new encryption key different from the second encryption key used before the group is cancelled in the cancellation step.

22. The computer-readable storage medium according to claim 21, the information processing method further comprising:

a monitoring step of monitoring the number of the information processing apparatuses within the predetermined range to detect whether the number of the information processing apparatuses increased or decreased;

a first judging step of judging whether or not a group exists in the predetermined range when it is detected that the number of the information processing apparatuses increased; and a second judging step of judging whether or not there is an information processing apparatus in the predetermined range when it is detected that the number of the information processing apparatuses decreased, wherein:

the generation step generates the new group when it is judged in the first judging step that no group exists in the predetermined range; and the cancellation step cancels the group when it is judged in the second judging step that there is no information processing apparatus in the predetermined range or when an information processing apparatus determined to be a built-in device exists in the predetermined range.

* * * * *